Jan. 26, 1943.                P. KOLLSMAN                2,309,401
                              PRESSURE GAUGE
              Filed March 5, 1941              2 Sheets-Sheet 1

INVENTOR
PAUL KOLLSMAN
BY Gunter Rathke
his ATTORNEY

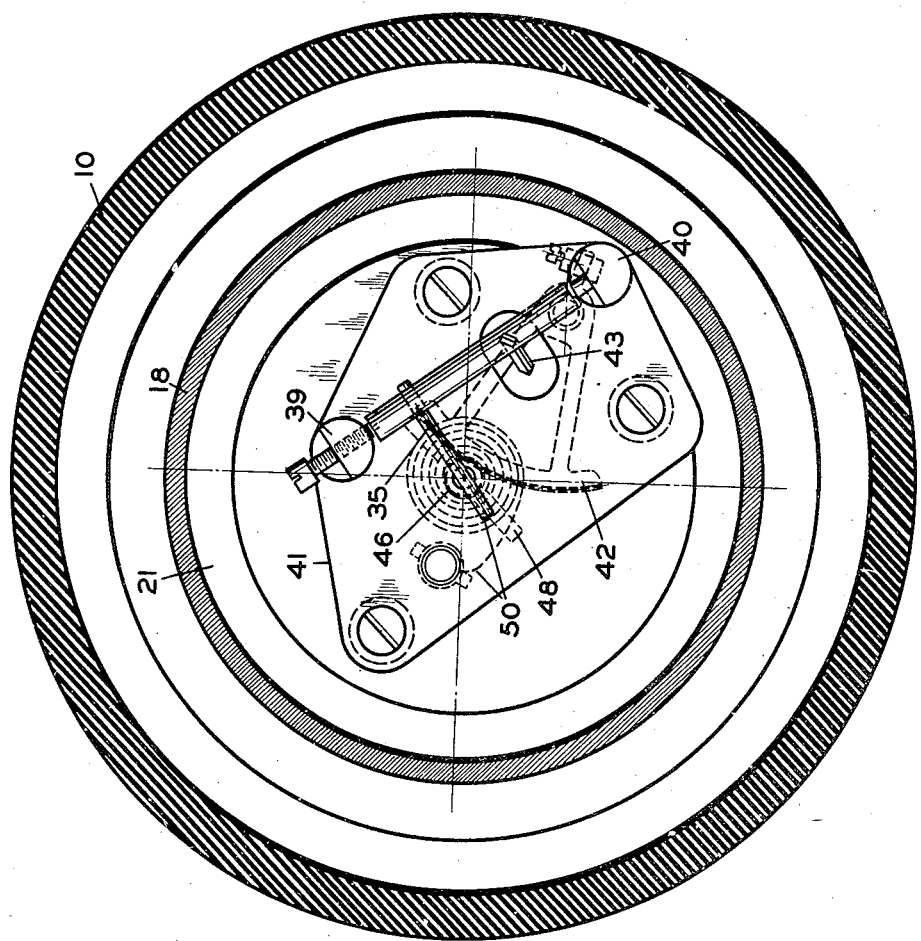
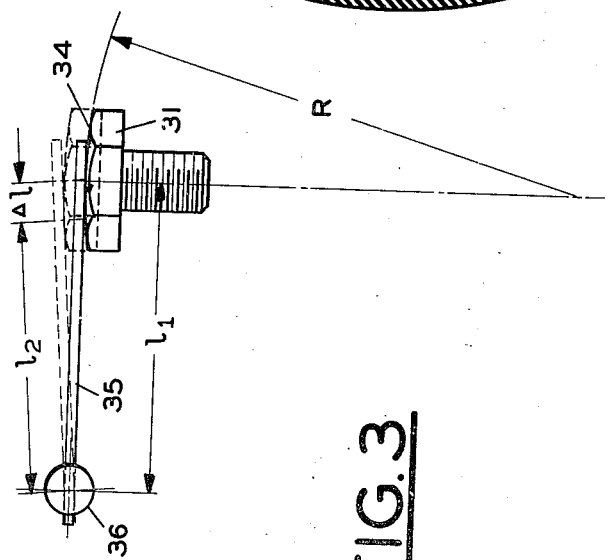

Patented Jan. 26, 1943

2,309,401

UNITED STATES PATENT OFFICE 2,309,401

PRESSURE GAUGE

Paul Kollsman, Greenwich, Conn., assignor to Square D Company, Detroit, Mich., a corporation of Michigan Application March 5, 1941, Serial No. 381,822

3 Claims. (Cl. 73—110)

This invention relates to improvements in pressure gauges, more particularly to gauges designed for measuring pressures of inflammable gases.

It is an object of this invention to provide an explosion resistant gauge having a highly sensitive mechanism and designed to withstand extreme pressures such as occur after explosion of inflammable gas mixtures without causing injury to an observer of the gauge.

More particularly, it is an object of this invention to provide an improved manifold pressure gauge for use on aircraft.

The invention further aims at providing a pressure gauge subdivided into a plurality of pressure chambers including means for sealing the chambers from one another during abnormally high pressure in one chamber.

The invention further aims at providing a highly sensitive pressure gauge of the multi-chamber type with a diaphragm capsule as its pressure responsive element, the gauge being preferably so designed that under excessive pressures the diaphragm seals the pressure chambers from one another.

It is a further object of the invention to provide an explosion resistant pressure gauge having a permanently sealed mechanism and including means for adjusting from the outside the zero position of the indicating means after aging of the diaphragm.

It is a further object of the invention to provide an explosion resistant pressure gauge including a spring loaded diaphragm, the spring load being adjustable from the outside.

The invention further aims at providing a pressure gauge including means for producing a pointer movement bearing a non-linear relation to the movement of the diaphragm.

More particularly, the invention aims at providing means for limiting or increasing the movement of the pointer towards one end of the measuring range in response to equal increments in diaphragm movement.

It is another object of this invention to provide a highly sensitive explosion resistant pressure gauge which is inexpensive to manufacture, easy to calibrate, and convenient to adjust from the outside.

Further aims, objects and advantages will appear from a consideration of the description which follows with accompanying drawings showing for purely illustrative purposes an embodiment of this invention. It is to be understood, however, that the description is not to be taken in a limiting sense, the scope of the invention being defined in the appended claims.

Referring to the drawings:

Fig. 2 is a section taken on line 2—2 of Fig. 1;

Fig. 3 shows on an enlarged scale elements of Fig. 1.

Figure 1:
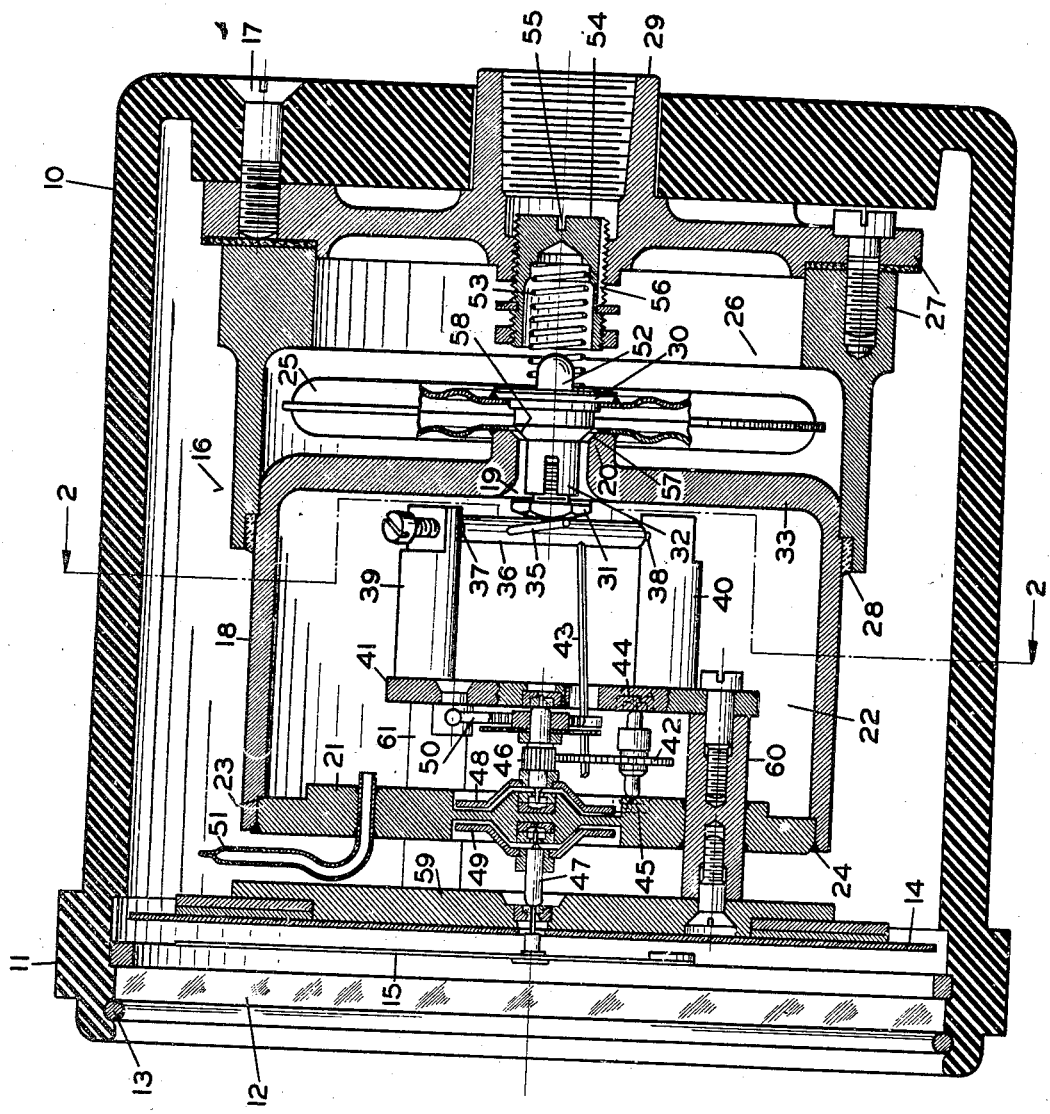
Fig. 1 is a cross-section of a gauge incorporating this invention.

The illustrated embodiment of the invention includes an instrument housing 10 which may be of a form standardized for aircraft. The instrument housing has a mounting flange 11 surrounding a front window 12 held in place by means of a snap ring 13. Indicating means are visible through the window 12 and have, in the illustrated embodiment, the form of a dial 14 and a pointer 15 movable relatively thereto.

Into the instrument housing there is inserted an explosion resistant cartridge or casing 16 secured to the rear of the housing by means of screws 17.

In the illustrated form of the invention the explosion resistant casing consists of a first cup-shaped member 18 having an aperture 19 at the bottom, the aperture being surrounded by an outwardly extending flange 20. A top member or plate 21 completes the first cup-shaped member to form a first pressure chamber 22. The top member or plate may be formed to rest against a shoulder 23 in the cup-shaped member and may after assembly be permanently secured thereto in any convenient manner such as by soldering at 24.

To the flange 20 of the member 18 there is secured a pressure responsive member, preferably in the form of a Sylphon or diaphragm capsule, which offers the advantage of greater accuracy and sensitivity over a single diaphragm connected to a rigid body at its periphery. Stress caused by such peripheral mounting is avoided in the illustrated example by the use of a diaphragm capsule 25 without the loss of the feature of explosion resistance of the gauge.

The pressure responsive member is enclosed in a second pressure chamber 26 formed by a second cup-shaped member 27 secured to the first member 18 in any suitable manner such as by soldering at 28. The second member 27 has a pipe coupling 29 for connection to a point of varying pressure, for example, the manifold of an internal combustion engine wherein variations in pressure are to be ascertained.

The movable wall of the pressure responsive member is preferably provided with a reinforced center portion shown in the illustrated embodiment of the invention as being a center piece 30. The illustrated form of center piece includes a threaded stem 31 adjustable in axial direction relatively to an internally threaded sleeve 32. The stem extends through the aperture 19 in the bottom of the cup-shaped member 18 forming a dividing wall 33 between the chambers 22 and 26. The stem 31 is preferably provided with a curved top surface 34 for purposes later to be described.

The top surface of the stem is engaged by a movable actuating member of a motion multiplying mechanism arranged in chamber 22.

In the illustrated form of the invention a lever 35 of a rockshaft 36 rests against the curved top of the stem. The rockshaft is mounted in pivots 37 and 38 and posts 39 and 40, respectively, on a mounting plate 41.

The rockshaft engages a toothed sector 42 by means of a further lever 43 preferably made of a bimetal to compensate for changes in temperature. The sector is mounted in bearings 44 and 45 between the mounting plate 41 and the top member or front plate 21 and engages a pinion 46 for actuating the pointer.

In the illustrated form of the invention the movement of the pinion 46 is transmitted to the pointer shaft 47 through the pressure resistant wall 21 of the chamber 22 by means of a magnetic coupling comprising magnets 48 and 49. A hair spring 50 may be provided for eliminating play in the motion amplifying mechanism and for maintaining the lever 35 in contact with the curved surface 34 of the stem 31.

The chamber 22 may be filled with a charge of gas of predetermined pressure, a tube connection being provided for this purpose at 51. For manifold pressure gauges it is preferred to evacuate the chamber 22 to a high degree after which the tube 51 is tightly sealed.

The pressure responsive member 25 may be acted upon by an adjustable spring. For this purpose the center piece 30 may be formed to include a stud 52 for receiving one end of a biasing spring 53. The other end of the biasing spring is supported by an adjustable member, in the illustrated embodiment a threaded boss 54 accessible from the outside through the pipe connection 29 into which it is screwed. The boss 54 is provided with a slot 55 for engagement with a screw driver and preferably also with a groove 56 permitting an unrestricted equalization of pressures between the pipe connection 29 and the chamber 26.

By adjusting the tension of the spring 53 the zero position of the pointer may be adjusted in case the pointer should fail to return to its initial position on the dial due to aging of the diaphragm. It becomes evident from the drawings that such adjustment does not require access to the elements of the motion amplifying mechanism which remain permanently sealed and protected within the pressure chamber 22. Furthermore this adjustment will not disturb the calibration of the instrument but simply restore the movable wall of the pressure responsive member to the position which it occupied when the instrument was first calibrated.

If an explosion should occur due to ignition of a combustible gas mixture in chamber 26, the diaphragm capsule 25 will be compressed thereby resting its center piece 30 against the flange 20 of the wall 33. To enhance this sealing action, the flange and the center piece may be so shaped as to form a valve seat and valve member respectively, a conical valve being shown at 57 in the flange against which the conical surface 58 of the center piece may rest.

The illustrated form of gauge is extremely easy to assemble and calibrate. The motion amplifying mechanism, as hereinbefore described, is mounted to the top member or front plate 21 which also carries the dial 18 and the dial plate 59 by means of posts 60 and 61. The mechanism is adjusted to produce a predetermined pointer deflection for a predetermined measuring range by adjusting the stem 31 relatively to the sleeve 32. It will be observed that during this calibration a pressure conduit may be connected to the pipe connection 29 and the diaphragm be subjected to the highest and lowest pressure to which the gauge is designed normally to respond. A removal of the front plate 21 for an adjustment of the stem 31 will not affect the pressure in the chamber 26.

As hereinbefore mentioned, the surface of the stem engaging the lever 35 may be so shaped as to produce an increasing and decreasing movement towards the beginning or end of the measuring range in response to equal increments in diaphragm movement. For this purpose the surface of the stem may be given any desired curvature as illustrated in Fig. 3. In the position of the stem shown in solid lines, the stem will act on the rockshaft 36 at a lever arm $l_1$. If moved towards the position shown in dotted lines, the lever arm will become shorter as the point of engagement of the lever 35 and the stem moves from the center of the stem outwardly by an amount $\Delta l$. The shorter the lever arm $l_2$ and the greater the distance $\Delta l$ the greater will be the movement of the rockshaft about its axis 37, 38 in response to equal increments in diaphragm movement.

After the proper adjustment of the stem 31 has been determined, the chamber 22 may be permanently sealed by soldering at 24 and evacuated, if so desired. Any aging of the diaphragm which will result in failure of the pointer to return to its proper zero position may be adjusted, without disturbing the mechanism, simply by adjusting the threaded boss 54.

Obviously, the present invention is not restricted to the particular embodiment herein shown and described. Moreover, it is not indispensible that all the features of this invention be used conjointly since they may advantageously be employed in various combinations and subcombinations.

What is claimed is:

1. A pressure gauge comprising, in combination, a first substantially cylindrical cup-shaped member having an aperture at the bottom surrounded by a flange extending outwardly; a top member sealed to said first cup-shaped member to form a first pressure chamber, the first chamber being evacuated; a diaphragm capsule mounted on said flange; a center-piece on the movable wall of said capsule extending through said aperture into said first chamber; a second substantially cylindrical cup-shaped member secured to the bottom of said first member for forming a second pressure chamber therewith enclosing said diaphragm capsule, said second cup-shaped member having a pipe connection; indicating means mounted to the outer side of said top member; motion amplifying mechanism mounted to the inner side of said top member, said mechanism including a lever and a spring urging the lever against said center-piece; and a magnetic coupling for actuating said indicating means by said mechanism through a wall of said top member.

2. A pressure gauge comprising, in combination, an explosion resistant housing, said housing comprising a substantially cup-shaped first member having a cylindrical side wall and a bottom having a first aperture surrounded by an outwardly extending flange, a front cover permanently sealed to said member and forming a first chamber therewith, a cylindrical second member sealed to said first member rearwardly of said first member, and a removable rear cover screwed to said second member to form a second chamber therewith, said rear cover having a screw threaded second aperture coaxial with said first aperture; a diaphragm capsule having a movable and a fixed wall, the latter being connected to said flange, the interior of the capsule communicating with said first chamber through said first aperture; a stem extending from the movable wall of said capsule through said first aperture into said first chamber; motion amplifying mechanism mounted to said front cover inside of said first chamber, said mechanism including a lever and a spring urging said lever against said stem; a magnetic coupling including two rotatable magnetic members mounted to the inside and outside of said front cover, respectively, for transmitting a rotary movement therethrough, one magnetic member being connected to said mechanism; indicating means actuated by said other magnetic member, the indicating means being mounted to the outside of said front cover; a spring bearing with one end against the movable wall of said capsule; and a screw threaded plug in said second aperture bearing against the other end of said spring, said plug being axially adjustable from the outside relatively to said second aperture for adjusting the tension of said spring, said plug having a groove providing a passage leading from said second chamber to the exterior thereof.

3. A pressure gauge comprising, in combination, an instrument casing including a front window; an explosion resistant housing mounted therein, said housing comprising a substantially cup-shaped first member having a cylindrical side wall and a bottom having a central first aperture surrounded by an outwardly extending flange, a front cover permanently sealed to said member and forming a first chamber therewith, a cylindrical second member sealed to said first member rearwardly of said first member, and a removable rear cover screwed to said second member to form a second chamber therewith, said rear cover having a screw threaded second aperture and a pipe coupling for connection to a source of pressure coaxial with said first aperture; said casing having an opening through which said pipe coupling extends; a tube communicating with said first chamber for evacuating the same; a diaphragm capsule having a movable and a fixed wall, the latter being connected to said flange, the interior of the capsule communicating with said first chamber through said first aperture; an axially adjustable stem extending from the movable wall of said capsule through said first aperture into said first chamber, said stem having a curved top surface; motion amplifying mechanism mounted to said front cover inside of said first chamber, said mechanism including a lever and a spring urging said lever against said top surface; a magnetic coupling including two rotatable magnetic members mounted to the inside and outside of said front cover, respectively, for transmitting a rotary movement therethrough, one magnetic member being connected to said mechanism; indicating means actuated by said other magnetic member, the indicating means being mounted to the outside of said front cover; a spring bearing with one end against the movable wall of said capsule; and a screw threaded plug in said second aperture bearing against the other end of said spring, said plug being axially adjustable from the outside of said casing through the bore of the pipe coupling relatively to said second aperture for adjusting the tension of said spring, said plug having a groove providing a passage from the interior of said second chamber to the base of the pipe coupling.

PAUL KOLLSMAN.